May 18, 1948.  K. L. JOHANSSON  2,441,767
PREDETERMINED COUNT CONTROL MECHANISM
Filed Nov. 20, 1944  3 Sheets-Sheet 1
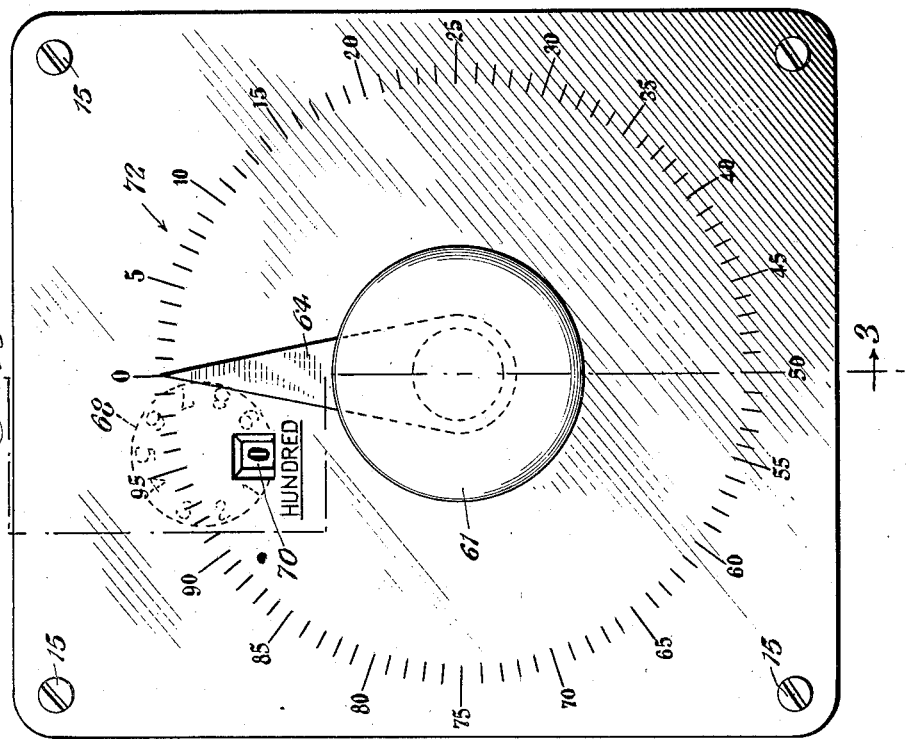
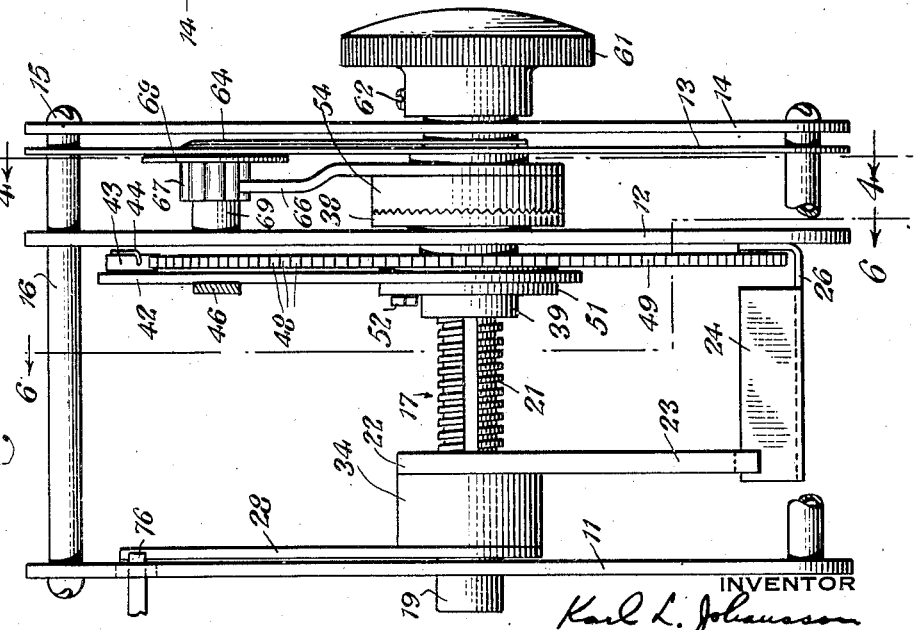
INVENTOR
Karl L. Johansson
BY
Emery, Varney, Whittemore & Dix
ATTORNEY May 18, 1948.　　　K. L. JOHANSSON　　　2,441,767
PREDETERMINED COUNT CONTROL MECHANISM
Filed Nov. 20, 1944　　　3 Sheets-Sheet 2
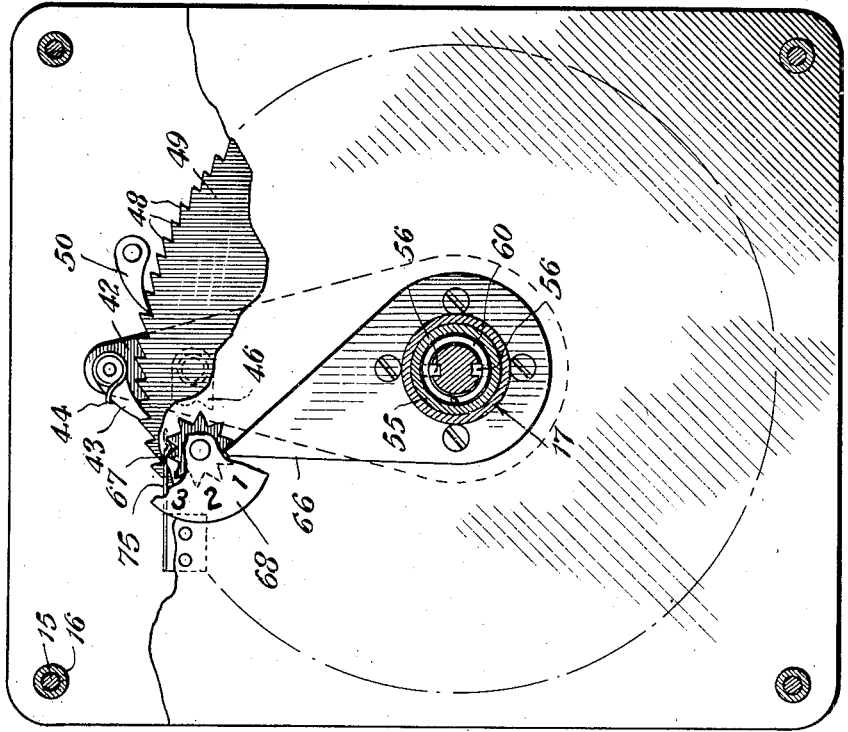
INVENTOR
Karl L. Johansson
BY
Emery, Varney, Whittemore & Dix
ATTORNEY

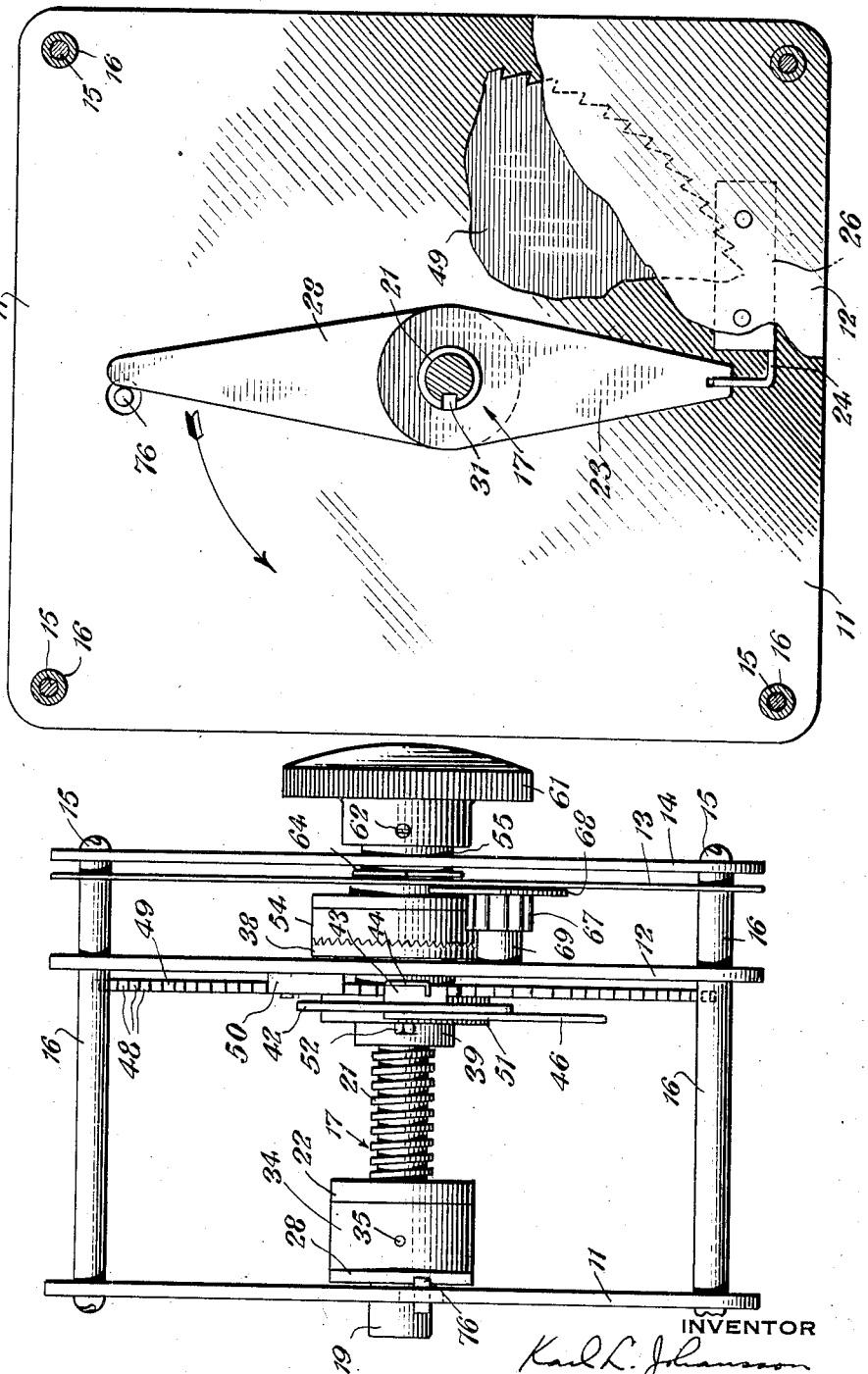

Patented May 18, 1948

2,441,767

UNITED STATES PATENT OFFICE 2,441,767

PREDETERMINED COUNT CONTROL MECHANISM

Karl L. Johansson, Hackensack, N. J., assignor to A. Kimball Company, New York, N. Y., a corporation of New York Application November 20, 1944, Serial No. 564,382

11 Claims. (Cl. 235—132)

This invention relates to counter mechanism, and more particularly to apparatus that can be set to move a driven element into contact with an abutment such as a switch or stop mechanism, after a predetermined number of actuations. Such apparatus is useful with printing presses and other equipment where it is desirable to have the equipment complete a definite number of operations and then stop.

It is an object of the invention to provide improved counter apparatus that can be set to bring a driven element and some abutment or switch into contact with one another after counting a number of operations for which the apparatus is set.

Counters are commonly made with step-by-step devices, such as pawl-and-ratchet mechanism, and when the number of operations to be counted is comparatively high, it is necessary to have the ratchet, or other part that rotates, turn through more than one revolution in order to keep the apparatus within a reasonable size and still not have such small steps that adjustment is critical. Another object of the invention is to provide counter apparatus, in which the step-by-step actuator rotates through more than one revolution, with a single setting element that can be turned for a number of complete revolutions and a fraction of a revolution through which the counter apparatus will move its driven element back to an original starting position.

In the preferred embodiment of the invention the driven element moves along a helical course as it is rotated by a pawl-and-ratchet device. The driven element is connected with a manually-operated knob or handle that is rotated to displace the driven element from an end position in which it contacts with an abutment or switch. In the preferred embodiment of the invention, this knob is turned through as many revolutions and fraction of a revolution as the driven element will move through in returning to starting position, but the invention can also be constructed so that the driven element can be moved axially along its helical path to provide for the complete revolutions to be made by the ratchet, and turned through an angle to provide for the fraction of a revolution where the number of operations to be counted are not an exact multiple of the number of teeth on the ratchet.

One feature of the invention relates to a combination in which clutch means are provided between the step-by-step actuator and the driven element. These clutch means are associated with the knob for setting the apparatus and provide a very simple and convenient construction by which the counter can be set without affecting the step-by-step actuator which ordinarily cannot be turned backward.

Other objects, features and advantages in the invention will appear or be pointed out as the description proceeds.

In the drawings, forming a part hereof, in which like reference characters indicate corresponding parts in all the views, Figure 1 is a side elevation, partly broken away, of counter mechanism embodying this invention.

Figure 2 is a front elevation of the structure shown in Figure 1.

Figure 3 is a sectional view taken on the line 3—3 of Figure 2.

Figure 4 is a sectional view, partly broken away, taken on the line 4—4 of Figure 1.

Figure 5 is a top plan view of the structure shown in the other figures, and

Figure 6 is a sectional view, partly broken away, taken on the line 6—6 of Figure 1.

The counter mechanism includes a frame comprising parallel plates 11, 12 and 13 and a transparent panel 14 held in assembled relation by fastenings such as bolts 15 extending through sleeves 16 that hold the plates and transparent panel in spaced relation. There is a shaft 17 extending through all of the plates 11—13, and through the panel 14. This shaft 11 is held against endwise displacement by a shoulder 18 that contacts with the rearward plate 11 and by a collar 19 pinned to a portion of the shaft 17 that extends beyond the rearward plate.

The intermediate portion of the shaft 17 is threaded and comprises a lead screw 21. A nut 22 fits over the threads of the lead screw 21. There is an arm 23 connected to the nut 22 and this arm extends downwardly and has a slotted end that straddles a stationary plate 24 for preventing rotation of the nut 22. The plate 24 serves as a stop for preventing rotation in either direction but does not interfere with the movement of the nut 22 and arm 23 lengthwise of the lead screw. The plate 24 is supported from some part of the frame, and is shown in the drawing as supported from the plate 12 by a bracket 26.

The driven element, which is returned to a zero or end position upon completion of a predetermined number of counts, comprises an arm 28 that extends out from a hub 29 which is movable lengthwise of the lead screw. This hub 29 is not threaded but slides on the top surfaces of the lead screw threads as bearings.

The hub 29 has a key 31 (Figure 6) that slides in a keyway 32 (Figure 3) extending the entire length of the lead screw 21 and beyond the end of the lead screw to the shoulder 18 of shaft 17. This constitutes a splined connection between the arm 28 and the shaft 17 so that the arm 28 rotates with the shaft 17 and always occupies the same angular position on the shaft.

There is an annular groove around the outside of the nut 22, and the hub 29 is connected to the nut 22 by a composite sleeve 34 which has a flange at its forward end extending into the groove around the nut 22. The sleeve 34 is fastened to the hub 29 by pins 35. This construction causes the arm 28 and hub 29 to move with the nut 22 lengthwise of the lead screw. The combination of axial movement imparted to the arm 28 by the nut 22, and rotary movement imparted to the arm 28 by its splined connection with the shaft 17 causes the arm 28 to move along a helical course as the shaft 17 rotates.

Just beyond the forward end of the lead screw there is a hub 37 that carries a clutch jaw 38. This hub 37 turns on the shaft 17 as a bearing and is connected with a bushing 39 by pins 40.

The bushing 39 serves as a bearing for an actuator arm 42 at the outer end of which there is a pawl 43 urged inwardly by a spring 44. The actuator arm 42 is connected with the apparatus, of which the operations are to be counted, by a link 46.

The pawl engages teeth 48 of a ratchet 49 and is held against the teeth by the spring 44. The link 46 is preferably connected with the apparatus, of which the operations are to be counted, at some point which causes a displacement of the link 46 through an angle that moves the ratchet 49 for a distance of one tooth for each operation of the apparatus. A stop pawl 50 prevents the ratchet 49 from turning backwards.

The actuator arm 42 is held on the bushing 39 by a washer 51 connected to the bushing by screws 52. This screw 52 also secures the ratchet 49 to the flange portion of the bushing 39. With this construction, the actuator arm 42 is free to oscillate on the flanged portion of the bushing 39 as a bearing, but the ratchet 49, bushing 39 and clutch hub 37 rotate as a unit.

The clutch hub 37 engages a movable clutch jaw 54 connected to a sleeve 55. The movable clutch jaw 54 has prong or key portions 56 (Figure 4) that extend into keyways in the forward portion of the shaft 17. This construction permits the clutch jaw 54 to move axially along the shaft 17 but causes the clutch jaw 54 to rotate with the shaft 17.

A collar 58 is pinned to the forward end of the shaft 17, and there is a spring 60 located in the sleeve 55 and compressed between the collar 58 and the back of the clutch jaw 54. This spring holds the clutch engaged. A knob 61 fits over the end of the sleeve 55 and is connected to the sleeve by a set screw 62. When the counter mechanism is to be set, the knob 61 is pulled forward to disengage the clutch, and the knob is turned to rotate the shaft 17 to the right. It is necessary to disengage the clutch because the pawl 43 prevents the ratchet 49 from turning to the right.

Indicators are provided for showing the displacement of the driven element 28 in terms of the number of actuations necessary to return the driven element 28 to its zero or end position. These indicators include a pointer 64 connected to the outside of the sleeve 55, and an operator 66 fastened to the clutch jaw 54 and having a pointed end that rotates a star wheel 67 to which a disc 68 is attached. The star wheel 67 and disc 68 have an axle 69 supported from the plate 12. There are numbers on the front face of the disc 68, and there is an opening 70 (Figure 2) through which some one of the numbers on the disc 68 is visible at any one time. The pointer 64 moves around a dial 72 on the front of the plate 13.

The ratchet wheel 49 preferably has 100 teeth and there are 100 graduations on the dial 72 corresponding to the steps that the ratchet wheel must make in completing one revolution. The operator 66 (Figure 4) is attached to the clutch plate in such position that it moves the star wheel 67 for a distance of one tooth and brings the next figure of the disc 68 into position to be visible through the opening 70 (Figure 2) each time that the pointer 64 passes the zero indication on the dial. A spring 75 has one end shaped to extend between the teeth of the star wheel 67 for yieldably holding the star wheel and the disc 68 in the various positions to which it is moved by the operator 66.

If the pointer 64 is in line with the 65th graduation on the dial 72, and the numeral 3 on the disc 68 is visible through the opening 70, this means that the apparatus must be actuated 365 times in order to restore the driven element to its original end position.

When the driven element is in its zero or end position it contacts with an abutment 76 which is shown as an element extending through an opening in the back plate 11. This abutment 76 may be the contact element of a switch or electric circuit, or may be connected with trigger mechanism, or any device, such as a stop mechanism, which it is desired to energize or actuate at the end of a predetermined number of movements of the counter mechanism.

The preferred embodiment of the invention has been illustrated and described, but various changes and modifications can be made, and some features of the invention can be used without others without departing from the invention as defined in the claims.

I claim as my invention:

1. Counter apparatus comprising an actuator, a driven element for contacting an abutment at the end of a predetermined number of operations of the actuator, a rotatable bearing member with which the driven element rotates, feed means operable during rotation of the driven element and bearing member for moving said element lengthwise along the bearing member, and a connection through which the bearing member is rotated by the actuator.

2. A counter mechanism for operating controlled apparatus after a predetermined number of actuations, said mechanism including a wheel, a device actuator for turning the wheel with a step-by-step movement corresponding to the number of actuations to be counted, a driven element, a bearing member along which the driven element is movable, motion transmitting connections through which the driven element and bearing member are rotated from the wheel with equal angular displacement and in timed relation with said wheel, means for shifting the driven element lengthwise along said bearing member at a rate coordinated with the rotary movement of the bearing member, and an abutment in position to be contacted by the driven element.

3. Counter mechanism comprising an abutment, a driven element for contact with said abutment in response to a predetermined number of counts by said mechanism, a support along which the driven element moves, a rotary device that turns through successive angles of movement for each count, positive mechanical connections through which angular movement of the rotary device is transmitted to the driven element, and a feed operated by rotation of said support for causing relative movement of the driven element and the abutment for bringing the abutment into the path of angular movement of the driven element.

4. Counter apparatus including a wheel, an actuator for turning the wheel through successive angular increments in response to each operation that is to be counted, a bearing member rotated by the wheel, an element on the bearing member and rotatable with said bearing member, and means for moving said element longitudinally along the bearing member as it rotates and at a speed so correlated with its speed of rotation that the bearing member travels on a helical course of such pitch that the wheel can make a predetermined number of complete revolutions before the driven element moves into position to strike an abutment located along the helical course.

5. Counter apparatus including a reciprocating connecting rod for actuation by the apparatus of which the operations are to be counted, a pawl actuated from said rod, a ratchet wheel having one hundred teeth and moved through an angle corresponding to one tooth by each actuation of the pawl, a lead screw, a clutch between the ratchet and lead screw for transmitting angular movement of the ratchet to the screw, a spring for holding the clutch normally engaged, an arm with a hub splined to the lead screw for rotation as a unit with the screw, a nut threading on the screw and operably connected with said hub for moving the hub lengthwise along the screw, a stop for preventing the nut from turning as it moves along the lead screw, an abutment in position to be contacted eventually by said arm, a pointer connected to the screw, a dial with graduations around which the pointer moves as the screw rotates, said dial having an opening, and a disc with numerals thereon, means operated from the screw for moving the disc through the angular distance between said numerals for each complete revolution of the lead screw, said numerals being in position for successive display through the opening in the dial as the disc is rotated.

6. Apparatus for moving a driven element into contact with an abutment upon completion of a predetermined number of actuations, said apparatus including a step-by-step device that is advanced progressively by successive actuations, mechanism operated by the step-by-step device for moving the driven element along a helical course, an indicator comprising a pointer that moves over a dial connections through which angular displacement of the driven element on its helical course is transmitted to said pointer, a second indicator with divisions thereon, means for moving the second indicator one division for each complete revolution of the driven element, a manually-operated adjustment for moving said mechanism in a direction opposite to that in which it is moved by the step-by-step device, figures on said indicators arranged in such order that they denote the number of actuations of the step-by-step mechanism necessary to return the driven element from the end position from which it has been displaced by the manually-operated adjustment, and a clutch connected with said manually-operated adjustment for releasing the step-by-step device from the driven element when the driven element is to be displaced in a reverse direction along its helical course by the manually-operated adjustment.

7. Counter apparatus comprising a step-by-step actuator, a driven element operated in one direction by said actuator, an abutment in position to be contacted by the driven element after continued movement by said actuator, a manually-operated adjustment for moving the driven element in the opposite direction, an indicator spaced from said driven element and having a motion different from that of the driven element, motion-transmitting connections between the indicator and the driven element, and a clutch between the actuator and driven element for disengaging the driven element from the actuator while said driven element remains connected with the indicator through said motion-transmitting means.

8. Counter mechanism comprising a step-by-step rotary actuator driven from the apparatus of which the operations are to be counted, an abutment, a driven member movable along a course and into contact with the abutment, an indicator, motion-transmitting connections between the driven member and the indicator for locating the indicator in a predetermined position for every position of the driven member, manually-operated means for backing the driven member away from the abutment, and legends on the indicator that read higher in the direction that the indicator moves when the driven member is backed away from the abutment, the spacing of said legends being correlated with the steps of the actuator so that the reading of the indicator designates the number of steps by said actuator necessary to move the driven member forward into contact with the abutment.

9. Counter apparatus for contacting an abutment after a predetermined number of actuations, said apparatus comprising a step-by-step actuator, a rotatable driven element, a support for said driven element and along which the driven element is movable in the direction of its axis of rotation, motion-transmitting connections by which the support is rotated from said actuator in timed relation therewith, and means by which both rotary and axial movement are imparted to the driven element by rotation of the support to move said element toward the abutment during the rotation of said support.

10. In counter apparatus that has a ratchet wheel, an actuator including a pawl that rotates the ratchet wheel in response to pulsations transmitted to the pawl from apparatus of which the operations are to be counted, and a rotatable driven element that is turned by the ratchet wheel into contact with an abutment after a predetermined number of movements of said ratchet wheel, the improvement that comprises a support for said driven element and along which the driven element is movable in the direction of its axis of rotation, motion-transmitting connections by which the support is rotated by said actuator, and means by which both rotary and axial movement are imparted to the driven element by rotation of the support to move said element toward the abutment during the rotation of said support.

11. Counter mechanism including a driven element, an actuator, motion transmitting connections between the actuator and the driven element for imparting angular movement to the driven element, means operated from the actuator and including a screw for causing the driven element to move lengthwise of its axis of angular movement, an abutment in position to be contacted by the driven element after continued movement of the driven element, a pointer connected with the driven element for movement through equal angles of displacement with said element, a dial over which the pointer moves, a disc with numerals thereon, and driving connections that turn the disc from one numeral to the next with each advance of the driven element for a distance corresponding to the lead of said screw.

KARL L. JOHANSSON.

REFERENCES CITED

The following references are of record in the file of this patent:

UNITED STATES PATENTS

| Number | Name | Date |
|---|---|---|
| 73,449 | Keiler | Jan. 21, 1868 |
| 364,373 | Reisch | June 7, 1887 |
| 488,521 | Hudson | Dec. 20, 1892 |
| 520,142 | Goddard | May 22, 1894 |
| 902,022 | Sturtevant | Oct. 27, 1908 |
| 1,056,411 | Grunow | Mar. 18, 1913 |
| 1,726,487 | Hoellrigl | Aug. 27, 1929 |
| 1,748,948 | Gassen | Mar. 4, 1930 |
| 2,361,572 | Smith | Oct. 31, 1944 |